United States Patent [19]

Mailfert

[11] Patent Number: 4,577,126

[45] Date of Patent: Mar. 18, 1986

[54] SYNCHRONOUS ELECTRIC MACHINE WITH SUPERCONDUCTIVE FIELD WINDINGS

[75] Inventor: Alain-Jacques Mailfert, Morsang-sur-Orge, France

[73] Assignee: Institut National Polytechnique de Lorraine, Nancy, France

[21] Appl. No.: 525,040

[22] PCT Filed: Oct. 19, 1982

[86] PCT No.: PCT/FR82/00171

§ 371 Date: Jun. 20, 1983

§ 102(e) Date: Jun. 20, 1983

[87] PCT Pub. No.: WO83/01541

PCT Pub. Date: Apr. 28, 1983

[30] Foreign Application Priority Data

Oct. 19, 1981 [FR]  France .............................. 81 19620

[51] Int. Cl.[4] .............................................. H02K 9/00
[52] U.S. Cl. .................................... 310/52; 310/114; 310/165; 310/268
[58] Field of Search ............... 310/10, 52, 40 R, 53, 310/64, 65, 165, 114, 268, 54, 112, 162, 163, 164, 158, 178

[56] References Cited

U.S. PATENT DOCUMENTS

| | | | |
|---|---|---|---|
| 3,401,286 | 9/1968 | French | 310/268 |
| 3,405,290 | 10/1968 | Hallas | 310/10 |
| 3,564,307 | 2/1971 | Kawabe et al. | 310/10 |
| 3,992,641 | 11/1976 | Heinrich | 310/114 |
| 4,097,758 | 6/1978 | Jenkins | 310/268 |
| 4,275,323 | 6/1981 | Hatch | 310/52 |

FOREIGN PATENT DOCUMENTS

| | | | |
|---|---|---|---|
| 1504565 | 8/1966 | France | 310/52 |
| 2280998 | 8/1974 | France | 310/162 |
| 2308237 | 11/1976 | France | 310/52 |
| 403049 | 6/1966 | Switzerland | 310/268 |
| 1084479 | 9/1969 | United Kingdom | 310/114 |

OTHER PUBLICATIONS

Fournet et al.; "UN Type D'Alternateur A Superconducteurs"; 10/1964; Paris, France.
Philips Research Reports; 6/1968; vol. 23; pp. 249–269; Eindhoven, Holland.

*Primary Examiner*—R. Skudy
*Attorney, Agent, or Firm*—Larson and Taylor

[57] ABSTRACT

A synchronous electrical machine including a fixed superconducting field winding to provide D.C. magnetic field when a D.C. current circulates through the winding. A fixed normally conducting armature is provided with a plurality of spaced-apart disks. Each disk is made from insulating material and is provided with flat windings for circulation of A.C. currents. A plurality of rotor disks is axially interleaved with the disks of the armature. Each rotor disk produces A.C. electromagnetic forces in the flat windings upon rotation of the rotor.

5 Claims, 9 Drawing Figures

SYNCHRONOUS ELECTRIC MACHINE WITH SUPERCONDUCTIVE FIELD WINDINGS

The invention relates to synchronous electric machines (alternator or motor) of the type comprising a fixed superconductive inductor through which flows a DC current for creating a continuous magnetic field with axial symmetry about the axis of rotation of the rotor and a wound armature with normal conductivity through which flow multi-phase alternating currents during operation, as well as a rotor comprising ferromagnetic masses rotating in the field of the field windings so as to create alternating electromotive forces in the fixed windings, with normal conductivity.

Rotary machines of the above type are already known which have the advantage, over rotary superconductor machines with rotary field windings, of doing away with the need for rotary seals in the circuit of the cryogenic fluid for cooling the inductor. None of these known machines is able to form a high powered machine. The article by J. Huret et al. in "Bulletin de la Société Francaise des Electriciens", vol 5, October 1964, No 58, pp 654 and 655 describes an alternator which is the transposition to the cryogenic field of conventional claw alternators in the automobile field: this is a machine whose rotor comprises a core in the form of a double cross, the two crosses surrounding the stator. The dynamo described in "PHILIPS Research Reports", vol 23, No 3, June 1968, pp 249–269 is of the homopolar type not comprising any armature with normal conductivity. The document FR-A-2 280 998 describes a rotary electric machine whose field windings and armature are both made from a superconductive material.

The present invention aims at providing a synchronous electric machine with superconductor answering better the requirements of practice than those previously known, especially in that it readily allows industrial powers to be reached.

To this end, the invention proposes more especially a machine in which the rotor is situated radially inside said wound armature and comprises several evenly spaced apart disks in the axial direction each of which comprises several ferromagnetic material masses spaced angularly evenly apart, the masses of all the disks being aligned.

Because of the use of a superconductive field winding, a very high polarizing field may be provided, permanently saturating the ferromagnetic material, which allows a low inductance value for the armature to be obtained, whatever the value of the armature currents. No sliding contact is required. The rotor may be formed by a massive piece withstanding well the centrifugal forces.

As a general rule, the field windings will be formed by a winding similar to that of a solenoid, creating a magnetic field with axial symmetry about the axis of rotation of the rotor. This latter will have to be centered accurately in the field windings for any deviation gives rise to electromagnetic forces which tend to increase it further during operation.

A screen made from an electricity conducting material will generally be provided between the wound armature and the field windings so as to protect this latter against the induction variations during operation of the machine.

The rotor may then be formed by a series of disks provided with evenly spaced ferromagnetic masses and supported by a common shaft for inputting or outputting mechanical power depending on whether the machine forms an alternator or a motor. The wound armature will have windings made from a material with normal conductivity, may then be disposed on fixed insulating disks, alternating with the disks of the rotor.

The invention will be better understood from reading the following description of a machine which forms a particular embodiment of the invention, given by way of example. The description refers to the accompanying drawings in which.

Figure 3:
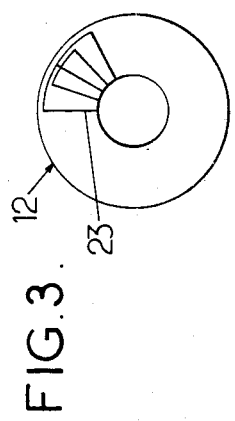
Figure 6:
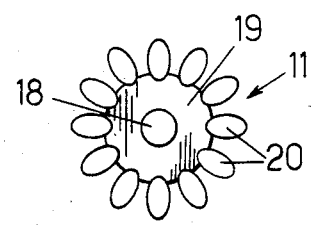
FIG. 6 is a left-hand view of the rotor of FIG. 5.
Figure 7:
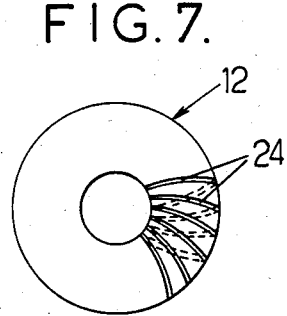
Figure 8:
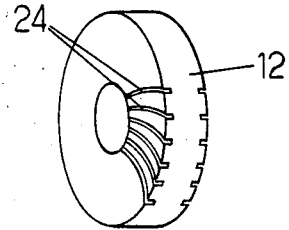
Figure 9:
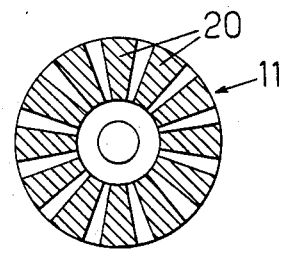

FIG. 7, similar to FIG. 3, shows an armature winding disk forming a variation:

FIG. 8 is a schematical perspective view of the disk of FIG. 7;

FIG. 9, similar to FIG. 6, shows a rotor disk usable with the fixed disk of FIG. 7.

Figure 2:
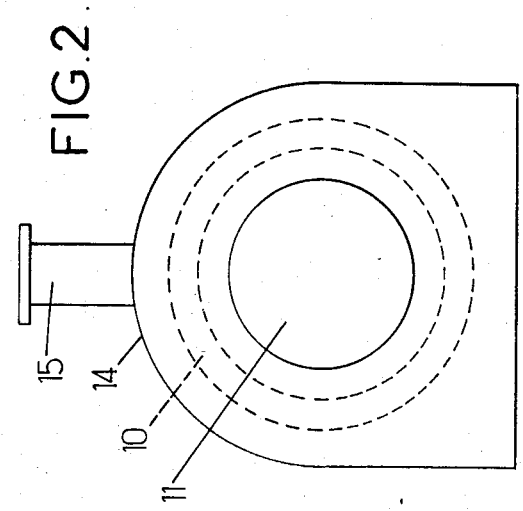
FIG. 2 is a left-hand view of the machine, with the rotor removed.
Figure 4:
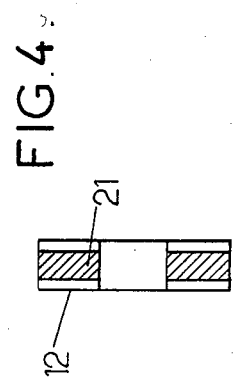
FIGS. 3 and 4 are schematical views showing, respectively in a right-hand view and in section, one of the disks of the armature windings.
Figure 1:
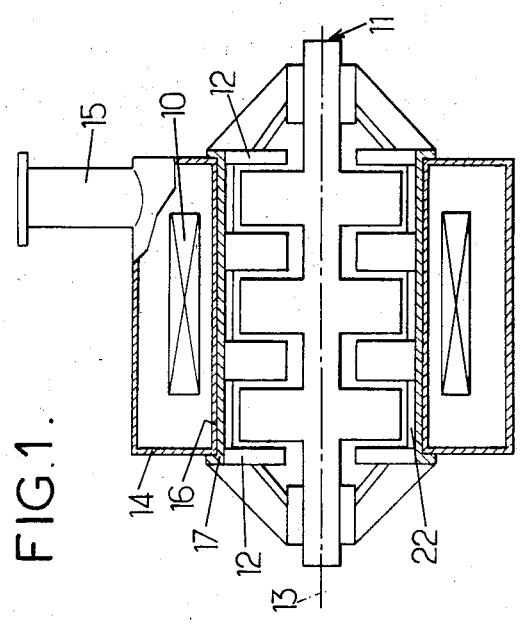
FIG. 1 is a simplified diagram of a rotary machine shown in section through a vertical plane.

The rotary machine shown in FIGS. 1 and 2, which may be used as alternator or as motor, comprises a superconductive field windings 10 through which there flows permanently a DC current, fixed multiphase normally conducting armature windings 12, which are seats of alternating electromotive forces during operation, and a rotor 11 provided with ferromagnetic masses which, under the effect of the field produced by the field windings, acquire magnetization.

These different components will now be described successively as well as the members which are directly associated therewith.

The superconductive field windings 10 shown in FIGS. 1 and 2 is formed by a cylindrical winding having an axis 13 along the axis of rotation of rotor 11. This winding will be formed from a conventional superconductive material, for example niobium-titanium, wound on an insulating mandrel in accordance with anyone of the different well-known technologies. This winding is placed in a liquid helium cryostat 14, also of conventional construction, having a liquid helium supply well 15. This cryostat 14, also constructed according to conventional techniques used for example for superconductive electromagnets for guiding particle beams, has a cylindrical internal wall 16 defining a chamber around axis 13 which forms an uncooled space.

To protect the superconductive winding 10 and the cooled metal parts of the cryostat against the variable magnetic fields produced during operation of the machine, the internal wall 16 is covered on the inside by a fixed metal screen 17 made from a good electricity conducting material. The thickness of screen 17 must be sufficient for the eddy currents which appear to compensate for the alternating fields produced by the armature windings 12 and by rotation of rotor 11. As a general rule, it is sufficient to give screen 17 a thickness twice the skin effect depth for the frequencies contemplated. For an alternator operating at 50 Hz, a copper screen having a thickness of about 1 cm is generally sufficient. Since the screen is likely to be subjected to high forces, it must be firmly fixed to the frame of the machine.

There may be further provided, around field windings 10 an additional screen for protecting the environment from the magnetic fields which it produces; but in practice, this field is not very troublesome, because it is continuous and this outer screen may be omitted since it would have to be very heavy to be efficient and would require accurate centering.

Figure 5:
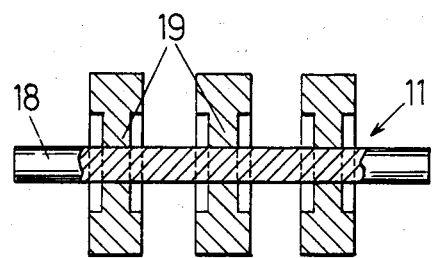
FIG. 5 is a simplified diagram showing one possible rotor construction, the disks which it supports being shown in section.

Rotor 11 may be solid or, on the contrary, in the form of a shaft 18 on which are secured one or more disks 19, three in number in the embodiment shown in FIGS. 1 and 5. Disks 19 are identical and are spaced apart at equal intervals. Sector shaped masses 20 are formed or added to disks 19 at regular intervals. These masses, twelve in number in the embodiment shown in FIG. 6, must be made from a ferromagnetic material, as are also disks 19 as a rule. This material must be chosen with the highest possible saturation magentization,. In practice, soft iron or an iron-cobalt alloy will generally be used. The field provided by the field windings 10 will have to be such that the material always presents its saturation magnetization (2.1 Teslas, in the case of soft iron). Thus, the magnetization is not disturbed, at least in the first order, by the armature reaction field and this latter will have no unfavorable influence on the electromotive force.

The armature windings 12 alternate with and overlap rotor disks 19 such that the internal windings 12 are interleaved or are interfitted between the disks 19 of the rotor. The windings 12 properly speaking may be formed on flat insulating supports in the form of disks 21 made for example from glass fiber reinforced resin. These disks 21 are fixed to the structure of the machine, for example by forming a stack of these disks 21 and distance pieces or spacers 22 (FIG. 1) which are clamped between end flanges (not shown). The insulating disks 21 are provided on each face with radial grooves in which are disposed conductors 23 (FIG. 3) for forming the multiphase multipole windings constituting the armature windings 12. These conductors of the armature windings are disposed and connected in accordance with the usual rules for forming windings for synchronous machines with flat geometry and are connected to the power terminals of the machine (not shown).

Masses 20 (FIG. 6) and the armature windings will have shapes adapted to each other so as to provide electromotive forces whose law of variation in time complies with requirements. When in particular the machine is to be coupled to the grid, these electromotive forces must be approximately sinusoidal. This result may typically be reached by placing the conductors of the armature windings in notches which give them the shape of approximately trapezoidal sectors, whereas masses 20 have a rounded shape, so that the winding surface covered by one of the masses is approximately sine shaped. But numerous shapes may be used different from those shown by way of examples.

The space occupied in the axial direction by the disks 19 of rotor 11 and by the armature windings 12 will be the result of a compromise: if the thickness of the fixed disk 21 is reduced, the electromotive force is increased, but, on the other hand, the armature currents and so the power of the machine are reduced. In practice, the axial dimension of the disks of rotor 11 and the spacing apart of the masses 20 which form it will be of the same order of magnitude. For each flat disk 21 provided with its windings, an axial length may be accepted of about a quarter of the axial space occupied by the disks and the masses of rotor 11.

To dissipate the heat released by Joule effect in the armature windings 12, it will frequently be necessary to provide, in these windings, a cooling circuit which is not shown, for it may be of a conventional type.

Whatever the embodiment chosen, it allows all the advantages of superconductive field windings machines to be kept, i.e. particularly a much smaller synchronous inductance than that of the large machine of conventional type, which reduces considerably the absorbed reactive power and increases the maximum performances, because one of the usual limitations of the maximum armature current is avoided (reduced stability because of the increase of the internal angle during permanent operation).

With respect to these machines, the machine of the invention presents the above-mentioned advantages. With respect to conventional synchronous machines whose windings are made from a material having normal conductivity, the invention presents the advantage of providing a machine whose ferromagnetic masses permanently completely saturated, so that their differential permeability is close to the permeability of a vacuum.

In the modified embodiment shown in FIGS. 7, 8 and 9, the disks of rotor 11 are provided with masses 20 in the form of trapezoidal sectors. The armature windings 12 are formed from conductors, preferably flat bars, housed in grooves 24 in the form of involutes of a circle hollowed out in the lateral faces of the fixed insulating disks. The opposite faces of the same fixed disk are provided with grooves 24 orientated in the reverse direction which allows an undulating winding to be formed for each of the phases by connecting the flat conductors to the external or internal periphery of the disks 21.

This armature may for example be cooled by forced longitudinal flow of a cooling gas through holes (not shown) formed in the disks at the position of grooves 24. These holes have a diameter greater than the width of the grooves which allows the conductors to be cooled by lateral contact of the gas with the flat bars.

The invention is susceptible of numerous other variations, relating not only to the construction of the masses and of the armature windings but also to the technological construction of the components. The armature windings may be disposed with respect to the superconductive inductor in a different way from the one shown. Screen 17 made from a conducting material (copper or aluminium alloy) may have a varying thickness, so as to provide a maximum attenuation where it is required, for example it may be thicker in its endmost parts. It goes without saying that such variations, as well more generally as others remaining within the scope of equivalences, must be considered as covered by the present patent.

I claim:

1. A synchronous rotating electrical machine comprising, in combination:
   a fixed stationary superconductive field winding adapted to provide a high intensity D.C. magnetic field having flux lines substantially parallel to an axis and a rotational symmetry about said axis in a region around said axis when a D.C. current circulates through said field winding;

a fixed normally conducting armature having a plurality of disks spaced along said axis, each disk made from an electric insulating material and having flat windings located in said region for circulation of multiphase A.C. currents;

and a rotor mounted for rotation about said axis, having a plurality of rotor disks axially interleaved with the disks of said wound armature, each said rotor disk carrying a plurality of identical ferromagnetic bodies evenly distributed angularly about said axis and located in said region for creating A.C. electromagnetic forces in said flat windings upon rotation of said rotor.

2. The machine according to claim 1, wherein said field winding is adapted to provide a magnetic field sufficient to maintain said ferromagnetic bodies permanently beyond saturation.

3. The machine according to claim 1, further comprising a fixed cylindrical conducting screen coaxial with the rotor.

4. A machine according to claim 1, wherein each of said armature disks is comprised of a flat support of glass fiber reinforced resin formed with radial grooves for receiving conductors of said flat windings.

5. A machine according to claim 4, wherein said ferromagnetic bodies have a rounded shape and the armature windings are approximately trapezoidal sectors in shape, whereby electromagnetic forces having sine-shaped variation are obtained.

* * * * *